(12) United States Patent
Nagasawa et al.

(10) Patent No.: US 7,212,803 B2
(45) Date of Patent: May 1, 2007

(54) COMMUNICATION CONTROL METHOD (75) Inventors: Kiyoshi Nagasawa, Yokohama (JP); Shiro Kihara, Yokohama (JP)

(73) Assignee: Hitachi, Ltd., Tokyo (JP)

(*) Notice: Subject to any disclaimer, the term of this patent is extended or adjusted under 35 U.S.C. 154(b) by 842 days.

(21) Appl. No.: 09/923,428

(22) Filed: Aug. 8, 2001

(65) Prior Publication Data
US 2002/0142802 A1 Oct. 3, 2002

(30) Foreign Application Priority Data
Mar. 30, 2001 (JP) ............................. 2001-098139

(51) Int. Cl.
*H04G 7/20* (2006.01)
(52) U.S. Cl. .................... 455/406; 455/417; 455/423; 370/230
(58) Field of Classification Search ................ 455/405, 455/416, 423, 406, 417, 419, 557; 370/338, 370/230; 375/219
See application file for complete search history.

(56) References Cited

U.S. PATENT DOCUMENTS

| | | | |
|---|---|---|---|
| 5,339,352 A * | 8/1994 | Armstrong et al. | 455/417 |
| 5,383,221 A * | 1/1995 | Akita et al. | 375/219 |
| 5,805,991 A * | 9/1998 | Foladare et al. | 455/406 |
| 5,826,198 A | 10/1998 | Bergins et al. | |
| 6,810,247 B1 * | 10/2004 | Halpern | 455/423 |
| 6,853,630 B1 * | 2/2005 | Manning | 370/338 |

FOREIGN PATENT DOCUMENTS

| | | | |
|---|---|---|---|
| EP | 0946068 A2 | | 9/1999 |
| JP | 09162908 A | * | 6/1997 |
| JP | A-09-018930 | | 1/1999 |
| JP | A-11-069017 | | 3/1999 |
| JP | A-11-275110 | | 10/1999 |
| JP | 11084886 | * | 10/2000 |

* cited by examiner

Primary Examiner—Fan Tsang
Assistant Examiner—M. S. Alam Elahee
(74) Attorney, Agent, or Firm—Mattingly, Stanger, Malur & Brundidge, P.C.

(57) ABSTRACT

A communication control method for controlling data communication conducted between a portable information communication terminal and a data communication apparatus via a communication network including a radio communication network includes the steps of: determining whether data communication between a portable information communication terminal and a data communication apparatus has been interrupted by disconnection of a communication line; and in response to normal termination of data communication between a portable information communication terminal and a data communication apparatus, clearing accounting on data communication that was interrupted between said portable information communication terminal and a data communication apparatus by disconnection of a communication line within a predetermined time before the normal termination of the data communication.

3 Claims, 9 Drawing Sheets

| CONNECTION TIME | CALL ORIGINATING PLACE | CALL ORIGINATION NUMBER | CONNECTION DESTINATION NUMBER | TERMINATION TIME | TERMINATION CODE | AMOUNT OF TRANSFER DATA |
|---|---|---|---|---|---|---|
| 17:05 | BASE STATION 1 | 090-1234 | 03-4567 | 17:06 | LINE DISCONNECTION | 25 |
| 17:08 | BASE STATION 2 | 090-1234 | 03-4567 | 17:15 | NORMAL COMPLETION | 2048 |
| 17:22 | BASE STATION 2 | 090-3456 | 045-9876 | 18:05 | NORMAL COMPLETION | 10800 |

| CONNECTION TIME | CALL ORIGINATION NUMBER | CONNECTION DESTINATION NUMBER | TERMINATION TIME | TERMINATION CODE | AMOUNT OF TRANSFER DATA | AMOUNT OF ACCOUNTING MONEY |
|---|---|---|---|---|---|---|
| 17:05 | 090-1234 | 03-4567 | 17:06 | LINE DISCONNECTION | 25 | 20 |
| 17:08 | 090-1234 | 03-4567 | 17:15 | NORMAL COMPLETION | 2048 | 190 |
| 17:22 | 090-3456 | 045-9876 | 18:05 | NORMAL COMPLETION | 10800 | 900 |

| ORIGINATING NUMBER | CONNECTION DESTINATION NUMBER | PREFERENTIAL CONNECTION TIME |
|---|---|---|
| 090-1234 | 03-4567 | 17:15 |
| 090-2345 | | |

| BASE STATION NUMBER | BASE STATION LOCATION | ADJACENT BASE STATION |
|---|---|---|
| BASE STATION 1 | XX OF EAST LONGITUDE | BASE STATION 2, BASE STATION 4 |
| BASE STATION 3 | | |

COMMUNICATION CONTROL METHOD

BACKGROUND OF THE INVENTION

The present invention relates to a communication control system for conducting control and accounting of data communication in a portable information communication terminal having a radio subscriber portion. In particular, the present invention relates to a technique that is effective when applied to a communication control system for suitably conducting control and accounting of data communication in the event of interruption occurrence of a communication line during data transfer.

Heretofore, data communication using radio communication has been provided. In the current radio communication, however, the radio field intensity rapidly attenuates and the communication line is disconnected in some situations, in such places that radio waves do not reach or hardly reach, such as tunnels or underground markets.

If disconnection of a communication line as described before occurs during data transfer, disconnection processing of data communication is conducted in the communication control apparatus. This results in a problem that data transfer must be conducted from the head of data even in the case where a line is reestablished and data transfer is continued.

And in the current accounting method, there is a problem that accounting is conducted even for data communication that has not been completed. In addition, there is a limit in the number of terminals that can be connected at a time to a radio base station that is conducting radio communication with portable information communication terminals. Even if recovery of a radio wave state is waited and reconnection is attempted after the disconnection of the communication line, therefore, re-connection cannot be achieved immediately. This is also a problem.

In a radio data communication protocol, such as PIAFS (PHS Internet Access Forum Standard) in current radio packet communication and PHS (Personal Handy-phone System), it has become possible to hold logical connection for line disconnection lasting up to 10 and several seconds, automatically reconnects the line after recovery of the radio wave state, and continue data transfer from the interrupted place.

Even if the above described communication protocol is used, however, there still exists the problem that the line is disconnected if the interruption of communication lasts a predetermined time length. In that case, the situation that the above described problems occur remains the same.

As for the problem that data need to be re-transmitted from the head of the data if the line is disconnected during data communication, there is a technique disclosed in JP-A-11-275110, "Radio data communication method and its device". According to this technique, control data is inserted at the head of transmitted and received data, and data transfer is resumed from the sequel of transferred data after re-establishment of the line.

As for the problem that accounting is conducted even for communication in which data transfer has not been completed, there is a technique disclosed in JP-A-11-69017, "Information distribution system". According to this technique, the accounting processing is canceled by discriminating interruption of downloading.

As for the problem of connection with a radio base station, there is a technique disclosed in JP-A-9-18930, "Line connection system and line connection method". According to this technique, a preferential line is secured for a terminal having a high priority order previously assigned thereto, at the time of registration of position information of the pertinent terminal.

SUMMARY OF THE INVENTION

In the above described prior technique, however, continuation of data transfer from the sequence number of transferred data is limited to a specific data form. And it is premised on that both the terminal and the data communication apparatus have a specific protocol.

In the case where accounting is canceled by discrimination of download interruption in the above described prior technique, the user might intentionally disconnect the line by, for example, interrupting the radio wave after the transfer of data required by the user has been completed and thereby cancel the accounting of the pertinent communication. Occurrence of such an illegal act is expected.

As for the problem of connection with a radio base station, there is needed a method of dynamically raising the priority order of the terminal interrupted in communication. In the prior technique, the method of dynamically raising the priority order is not described.

An object of the present invention is to provide a technique capable of solving the above described problems and preventing occurrence of extra accounting on a communication user in the case where a communication line is disconnected during data communication for a portable information communication terminal and the communication user connects the line again and continues the data communication.

Another object of the present invention is to provide a technique capable of reducing the trouble and time of data communication at the time of reconnection in the case where a communication line is disconnected during data communication for a portable information communication terminal.

Another object of the present invention is to provide a technique capable of conducting reconnection smoothly in the case where a communication line is disconnected during data communication for a portable information communication terminal.

Another object of the present invention is to provide a technique capable of automatically conducting reconnection and reducing the trouble and time of data communication at the time of reconnection in the case where a communication line is disconnected during data communication for a portable information communication terminal.

In a communication control system for controlling data communication conducted between a portable information communication terminal and a data communication apparatus via a communication network including a radio communication network, accounting on data communication interrupted by disconnection of a communication line is cleared after normal termination of the pertinent data communication, in accordance with the present invention.

When a portable information communication terminal is conducting data communication with a certain data communication apparatus, a communication control apparatus according to the present invention manages a terminal number and a connection destination number respectively capable of identifying the pertinent portable information communication terminal and the pertinent data communication apparatus, the termination state of the pertinent communication, and the termination time. It is determined whether the data communication between the pertinent portable information communication terminal and the pertinent data communication apparatus is interrupted by disconnection of a communication line. It is determined whether data communication is conducted again with a combination of the same terminal number and the same connection destination number within a predetermined time from the interruption time. If the data communication conducted again terminates normally (such as normal line disconnection), then accounting on the previous data communication interrupted by disconnection of the communication line is canceled. As a result, accounting that is inconvenient to the user can be avoided.

On the other hand, if there is not communication that has been terminated normally, then the accounting on the data communication interrupted by disconnection of a communication line is not canceled. Therefore, it becomes possible to prevent the user from committing an illegality, such as, for example, interrupting the radio wave and thereby conducting intentional line disconnection at the time when transfer of data required for the user has completed, and causing canceling the accounting.

According to the present invention, accounting on the data communication interrupted by disconnection of a communication line is cleared after normal termination of the pertinent data communication as heretofore described. When a communication line is disconnected during data communication with the portable information communication terminal and the user of the communication connects a line again and continues data communication, therefore, it is possible to prevent occurrence of extra accounting on the user of the pertinent communication.

DESCRIPTION OF THE EMBODIMENTS

Hereafter, a communication control system of an embodiment for conducting control and accounting of data communication in a portable information communication terminal having a radio subscriber portion.

Figure 1:
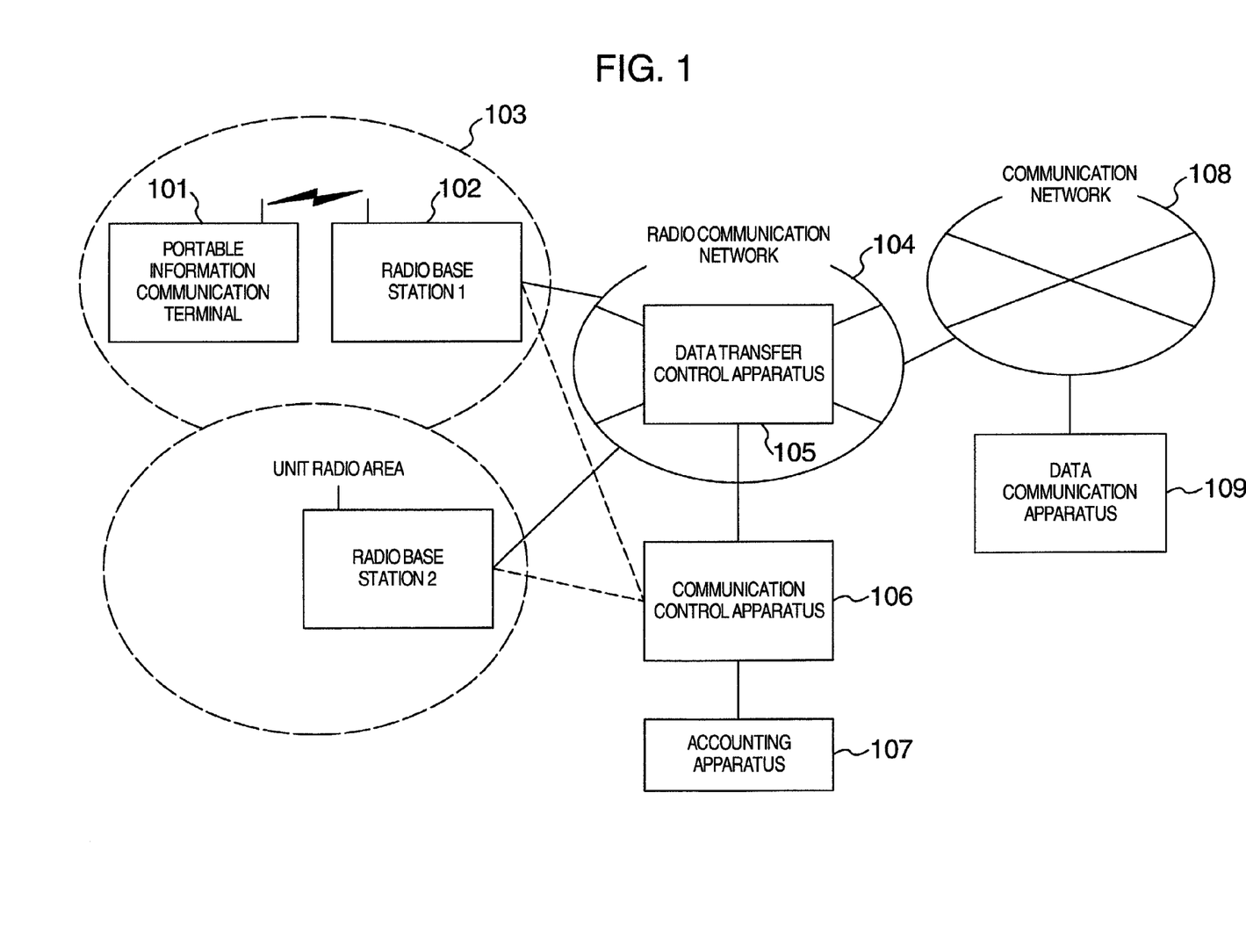
FIG. 1 is a diagram showing an example of a system configuration of an embodiment.

FIG. 1 is a diagram showing an example of a system configuration of the present embodiment. As shown in FIG. 1, a portable information communication terminal 101 and a data communication apparatus conducts data communication in the present system. That is, the portable information communication terminal 101 is in a radio area 103 of a radio base station 102. Herein, radio communication is conducted. If the portable information communication terminal 101 moves to the outside of the radio area 103, then radio communication between the portable information communication terminal 101 and the radio base station 102 is interrupted. If communication is continued between the portable information communication terminal 101 and the radio base station 102. Or a radio wave from any radio base station is not sufficient, then it becomes impossible to continue radio communication.

The radio base station 102 and other radio base stations forming other radio area units are connected to a radio communication network 104. The radio communication network 104 is also connected to other communication networks represented by a communication network 108. Communication with terminals and a data communication terminal 109 connected to each communication network is conducted. As a matter of course, communication is closed only in the radio communication network 104 in some cases.

As for communication data flowing within the radio communication network 104, the connection destination and the amount of data transfer thereof are controlled by a data transfer control apparatus 105. For example, in the case of packet communication, the amount of data transfer is the number of transferred packets.

A communication control apparatus 106 is connected to the radio base station 102 and the data transfer control apparatus 105. From the radio base station 102, there is obtained position information of the portable information communication terminal 101 a radio wave of which is seized by the radio base station 102, besides radio base station number information that identifies the radio base station 102. In the case where communication has been conducted between the portable information communication terminal 101 and the radio base station 102, there are obtained from the radio base station 102, the time when the connection is established, the time when the disconnection is conducted, a terminal number (such as a telephone number or an IP address) that identifies the connected portable information communication terminal 101, a connection destination number (such as a telephone number or an IP address) that identifies the destination of connection that is being conducted (or that has been conducted) by the portable information communication terminal 101, and information of termination situation in the case where radio communication has been disconnected (such as whether it is normal completion disconnected from the terminal side or line disconnection caused by a radio wave becoming incapable of being seized). Furthermore, from the data transfer control apparatus 105, there is obtained information concerning the data transfer state of the radio communication network 104, such as the amount of data transferred from a certain IP address to another certain IP address.

From the communication control apparatus 106, an accounting apparatus 107 receives information that identify a terminal connected to the radio communication network 104 and the data communication apparatus 109 connected to the communication network 108, information concerning the connection and disconnection thereof, and information concerning the amount of transferred data. The accounting apparatus 107 thus conducts accounting calculation.

Figure 2:
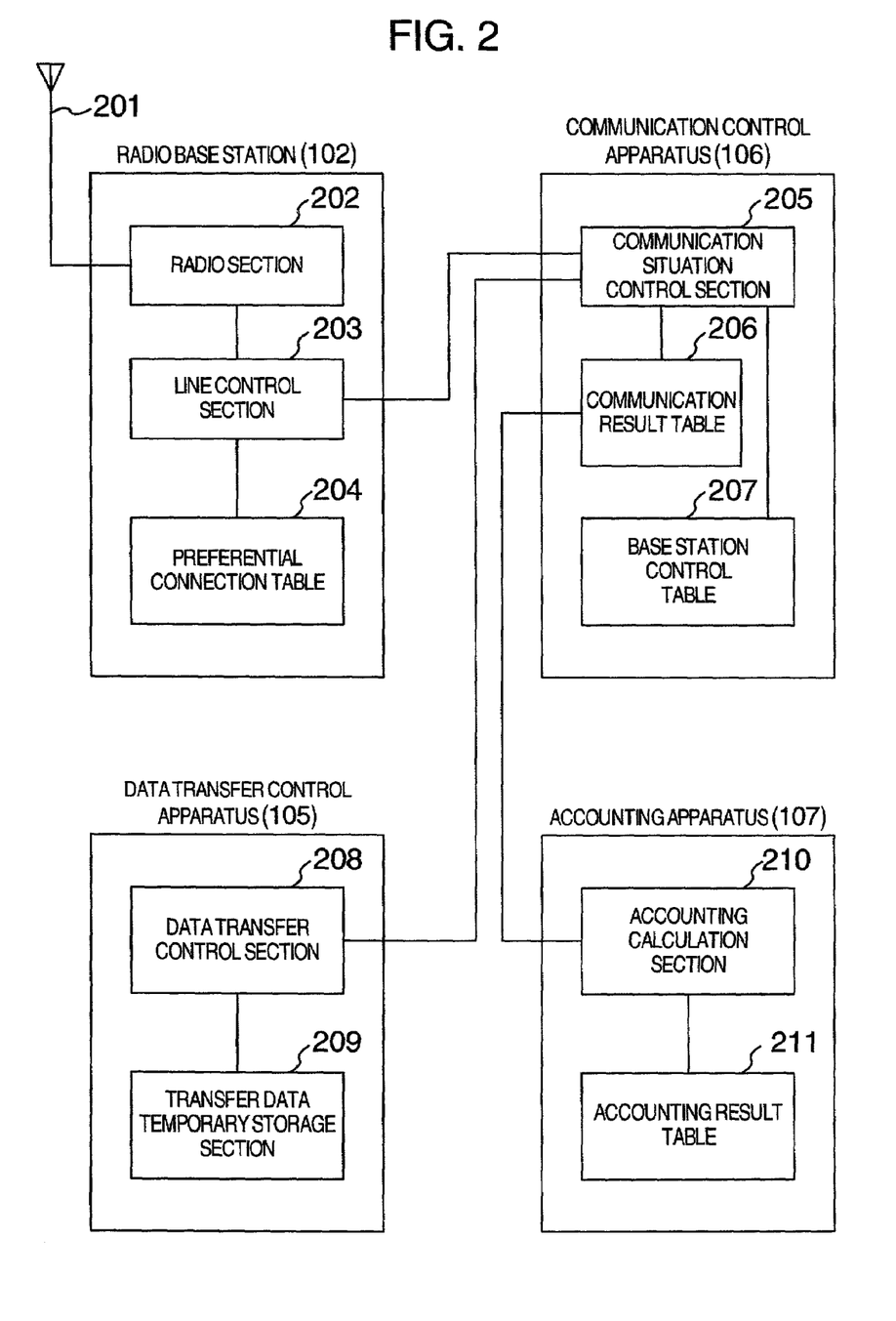
FIG. 2 is a diagram showing a schematic configuration of a radio base station 102, a data transfer control apparatus 105, a communication control apparatus 106 and an accounting apparatus 107 shown in FIG. 1 of the present embodiment.

FIG. 2 is a diagram showing a schematic configuration of the radio base station 102, the data transfer control apparatus 105, the communication control apparatus 106, and the accounting apparatus 107. As shown in FIG. 2, the communication control apparatus 106 includes a communication situation control section 205. The communication situation control section 205 is a processing section for conducting processing of determining whether data communication between the portable information communication terminal 101 and the data communication apparatus 109 is interrupted by disconnection of a communication line, ordering transfer of transfer data stored in a transfer data temporary storage section 209 but not yet been transferred, distribution of preferential connection information for preferentially connecting a portable information communication terminal 101 interrupted in data communication by disconnection of a communication line, and ordering connection to the portable information communication terminal 101.

A program for making the communication control apparatus 106 function as the communication situation control section 205 is recorded on a recording medium such as a CD-ROM, stored on a magnetic disc or the like, then loaded into a memory, and executed. By the way, the recording medium for recording the program may also be a recording medium other than the CD-ROM. Furthermore, the program may also be installed on an information processing apparatus from the recording medium and then used. Or the program may also be used by accessing the recording medium via the network.

The accounting apparatus 107 includes an accounting calculation section 210. If data communication between the portable information communication terminal 101 and the data communication apparatus 109 has been normally terminated, then the accounting apparatus 107 clears accounting for data communication interrupted of a communication line between the portable information communication terminal 101 and the data communication apparatus 109, within a predetermined time from the termination of the data communication that has been normally terminated.

A program for making the accounting apparatus 107 function as the accounting calculation section 210 is recorded on a recording medium such as a CD-ROM, stored on a magnetic disc or the like, then loaded into a memory, and executed. By the way, the recording medium for recording the program may also be a recording medium other than the CD-ROM. Furthermore, the program may also be installed on an information processing apparatus from the recording medium and then used. Or the program may also be used by accessing the recording medium via the network.

The data transfer control apparatus 105 includes a data transfer control section 208. The data transfer control section 208 is a processing section for storing transfer data transferred between the portable information communication terminal 101 and the data communication apparatus 109 in the transfer data temporary storage section 209, and transferring the stored transfer data to the portable information communication terminal 101.

A program for making the data transfer control apparatus 105 function as the data transfer control section 208 is recorded on a recording medium such as a CD-ROM, stored on a magnetic disc or the like, then loaded into a memory, and executed. By the way, the recording medium for recording the program may also be a recording medium other than the CD-ROM. Furthermore, the program may also be installed on an information processing apparatus from the recording medium and then used. Or the program may also be used by accessing the recording medium via the network.

The radio base station 102 includes a line control section 203. The line control section 203 is a processing section for receiving the preferential connection information and securing a vacant line. When a call incoming request from a portable information communication terminal 101 that conforms to the preferential connection information is detected, the line control section 203 connects the portable information communication terminal 101 preferentially by using the secured vacant line.

A program for making the radio base station 102 function as the line control section 203 is recorded on a recording medium such as a CD-ROM, stored on a magnetic disc or the like, then loaded into a memory, and executed. By the way, the recording medium for recording the program may also be a recording medium other than the CD-ROM. Furthermore, the program may also be installed on an information processing apparatus from the recording medium and then used. Or the program may also be used by accessing the recording medium via the network.

With reference to FIG. 2, the radio base station 102 includes an antenna 201 and a radio section 202 for conducting radio communication with a portable information communication terminal 101, the line control section 203 for controlling radio communication lines, and a preferential connection table 204 for setting a portable information communication terminal 101 to be preferentially connected and preferential connection conditions.

Furthermore, the communication control apparatus 106 includes a communication situation control section 205 for acquiring information concerning the communication situation from the line control section of the radio base station 102 and conversely supplying control information to the line control section 203, a communication result table 206 responsive to termination of one communication call to record a result of the communication, and a radio base station control table 207 for controlling the location of each radio base station and information of adjacent radio base stations adjacent in radio area to each radio base station.

The communication situation control section 205 is connected to the data transfer control section 208 of the data transfer control apparatus 105 as well. The communication situation control section 205 acquires information of the data transfer destination and the amount of transfer data from the data transfer control section 208, and supplies information directing the data transfer destination to the data transfer control section 208.

The data transfer control apparatus 105 includes the data transfer control section 208 and the transfer data temporary storage section 209 for temporarily storing data flowing through the radio communication network 104. The accounting apparatus 107 includes the accounting calculation section 210 for conducting accounting calculation by referring to the communication result table 206, and an accounting result table 211 for storing its calculation result.

Figure 3:
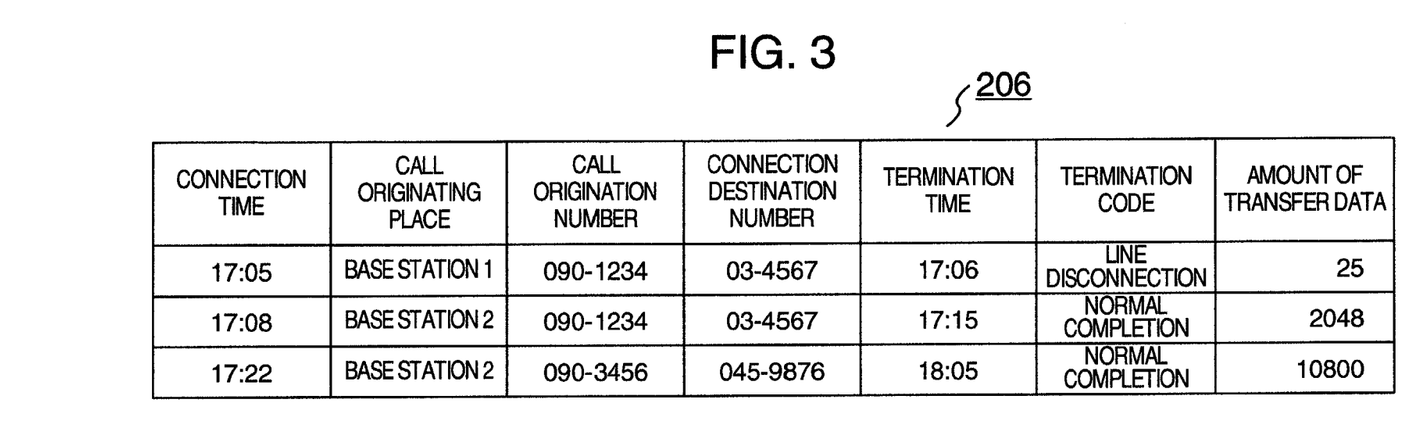
FIG. 3 is a diagram showing a configuration example of a communication result table 206 of the present embodiment.

FIG. 3 is a diagram showing a configuration example of the communication result table 206 of the present embodiment. In this example, there are included line connection time acquired from the line connection section 203, a call origination place, which indicates a radio base station 102 that has conducted radio communication, a call origination number for identifying a connected terminal, a connection destination number for identifying connection destination, termination time when the radio communication has been terminated, a termination code for indicating the termination state of the radio communication, and the amount of transfer data acquired from the data transfer control section 208.

Figure 4:
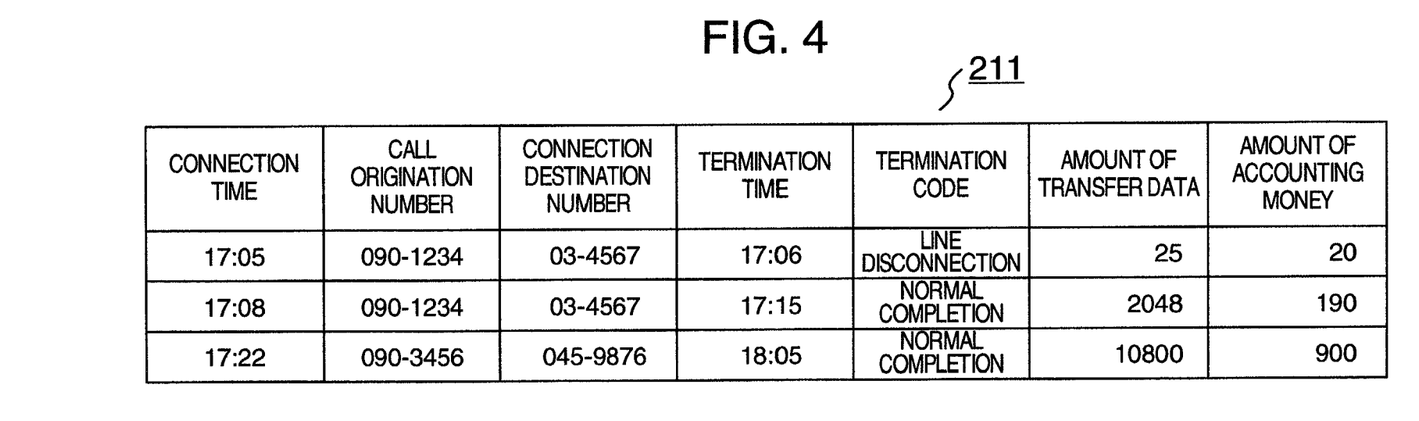
FIG. 4 is a diagram showing a configuration example of an accounting result table 211 of the present embodiment.

FIG. 4 is a diagram showing a configuration example of the accounting result table 211 of the present embodiment. In this example, an amount of accounting money is added instead of the information of the call origination place included in the communication result table 206.

Figure 5:
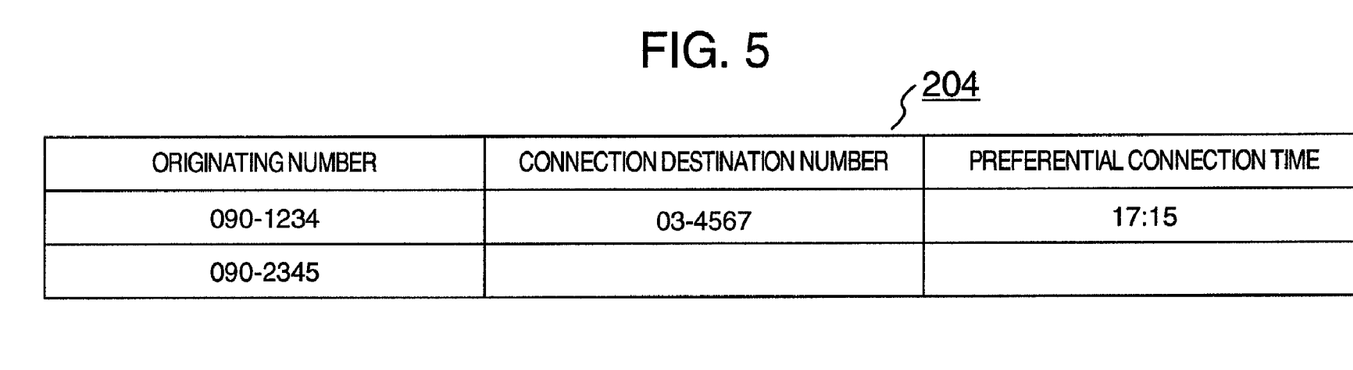
FIG. 5 is a diagram showing a configuration example of a preferential connection table 204 of the present embodiment.

FIG. 5 is a diagram showing a configuration example of the preferential connection table 204 of the present embodiment. In this example, there are included a call origination number for identifying a portable information communication terminal to be connected preferentially, a connection destination number for identifying the connection destination, and preferential connection time, which is time when the preferential connection is permitted.

Figure 6:
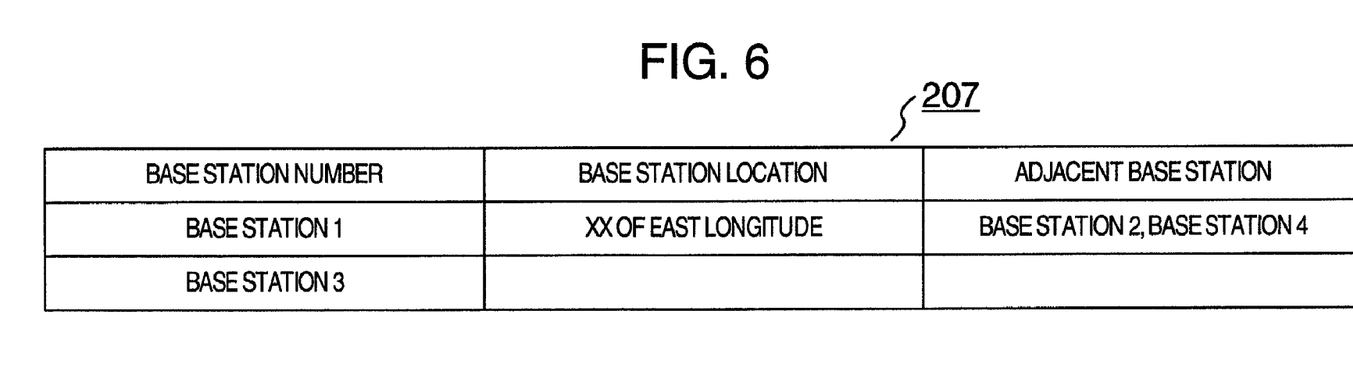
FIG. 6 is a diagram showing a configuration example of a radio base station control table 207 of the present embodiment.

FIG. 6 is a diagram showing a configuration example of the radio base station control table 207 of the present embodiment. In this example, there are included in association with each radio base station number, a radio base station location and numbers of adjacent radio base stations adjacent in radio area to each radio base station.

Hereafter, operation of the present embodiment based on the above described configuration will be described by referring to FIGS. 7 to 11.

Figure 7:
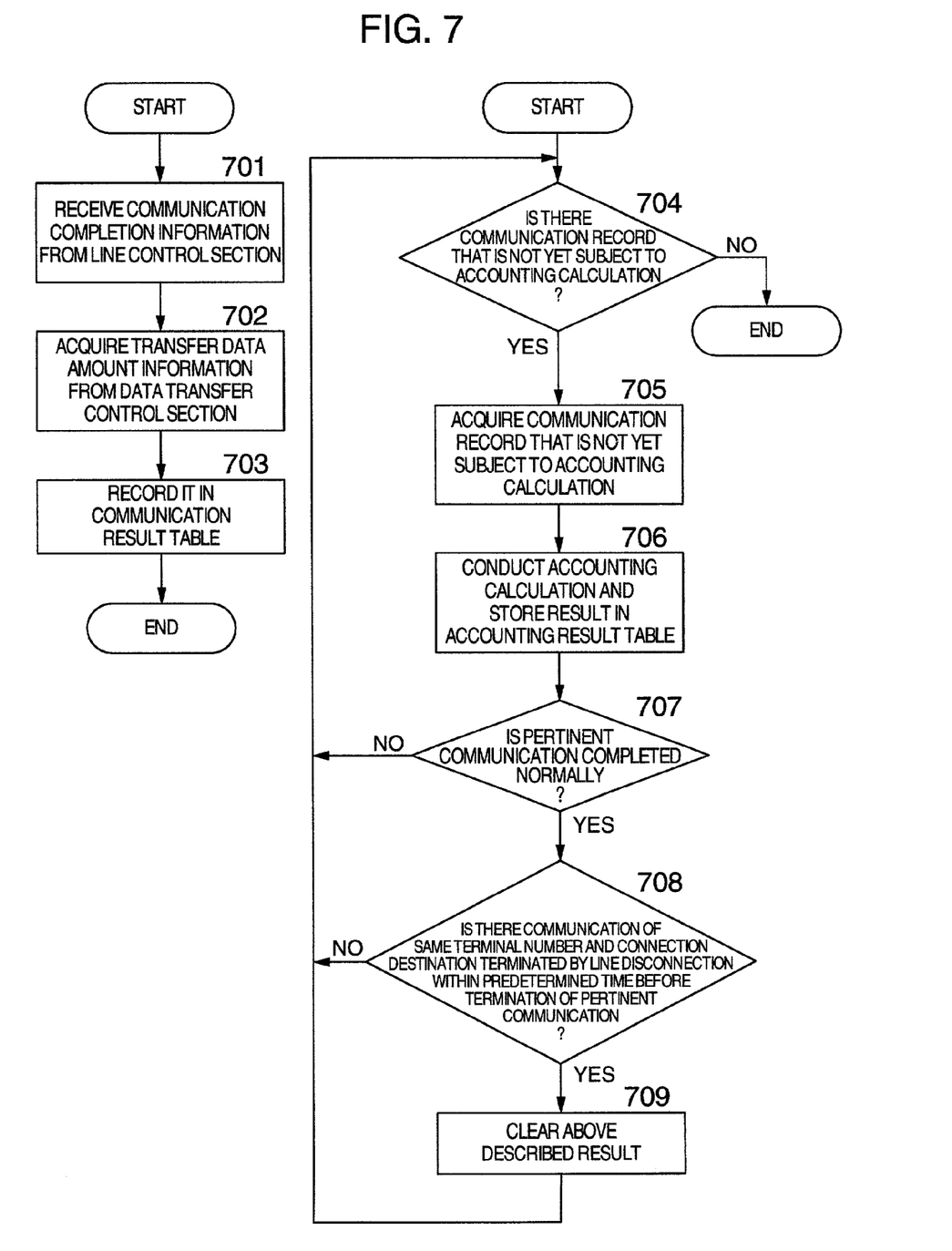
FIG. 7 is a flow chart showing a processing procedure of processing of clearing accounting for data communication interrupted by disconnection of a communication line after normal termination of the pertinent data communication, according to the present invention.

FIG. 7 is a flow chart showing a procedure of processing of clearing accounting for data communication interrupted by disconnection of a communication line, after normal termination of the pertinent data communication, according to the present embodiment. As shown in FIG. 7, the communication situation control section 205 of the communication control apparatus 106 of the present embodiment conducts processing of determining whether data communication between the portable information communication terminal 101 and the data communication apparatus 109 has been interrupted by disconnection of a communication line. Furthermore, if data communication between the portable information communication terminal 101 and the data communication apparatus 109 has been terminated normally, the accounting calculation section 210 of the accounting apparatus 107 conducts processing of clearing the accounting for the data communication interrupted by disconnection of a communication line between the portable information communication terminal 101 and the data communication apparatus 109, within a predetermined time from the normal termination of the data communication.

As shown in FIG. 7, the communication situation control section 205 of the communication control apparatus 106 receives communication completion information from the line control section 203 (step 701). On the other hand, the communication situation control section 205 acquires information of the amount of transfer data from the data transfer control section 208 (step 702), edits those kinds of information, and stores a result thereof in the communication result table 206 (step 703).

The accounting calculation section 210 of the accounting apparatus 107 determines whether there is a communication record that has not yet been subject to accounting calculation, by referring to the communication result table 206 (step 704). If any, the accounting calculation section 210 acquires its communication record (step 705), conducts accounting calculation, and stores its result in the accounting result table 211 (step 706).

On the other hand, the accounting calculation section 210 determines whether the communication has been normally completed by referring to the communication termination code of the communication record (step 707). If the communication has not been terminated normally, the accounting calculation section 210 terminates the accounting processing for that communication temporarily, returns to step 704, and continues accounting processing for other communication.

If the pertinent communication has been terminated normally, then the accounting calculation section 210 determines whether there is communication that has been disconnected in line between the same terminal number and the same connection destination as the pertinent communication within a predetermined time before the termination of the pertinent communication (step 708). The predetermined time is given separately.

If there is communication that meets the above described conditions, then the accounting calculation section 210 clears accounting imposed on the communication (step 709). If there is no communication that meets the above described conditions, then the accounting calculation section 210 returns to the step 704, and continues accounting processing for other communication.

Owing to the series of operations, the processing of clearing the accounting on the data communication interrupted by disconnection of the communication line, after the normal termination of the pertinent data communication can be implemented.

As described above, accounting that is inconvenient for the user can be avoided in the present embodiment. On the other hand, if there is not communication that has been terminated normally, then the accounting on the data communication interrupted by disconnection of a communication line is not canceled. Therefore, it becomes possible to prevent the user from committing an illegality, such as, for example, interrupting the radio wave and thereby conducting intentional line disconnection at the time when transfer of data required for the user has completed, and causing canceling the accounting.

Figure 8:
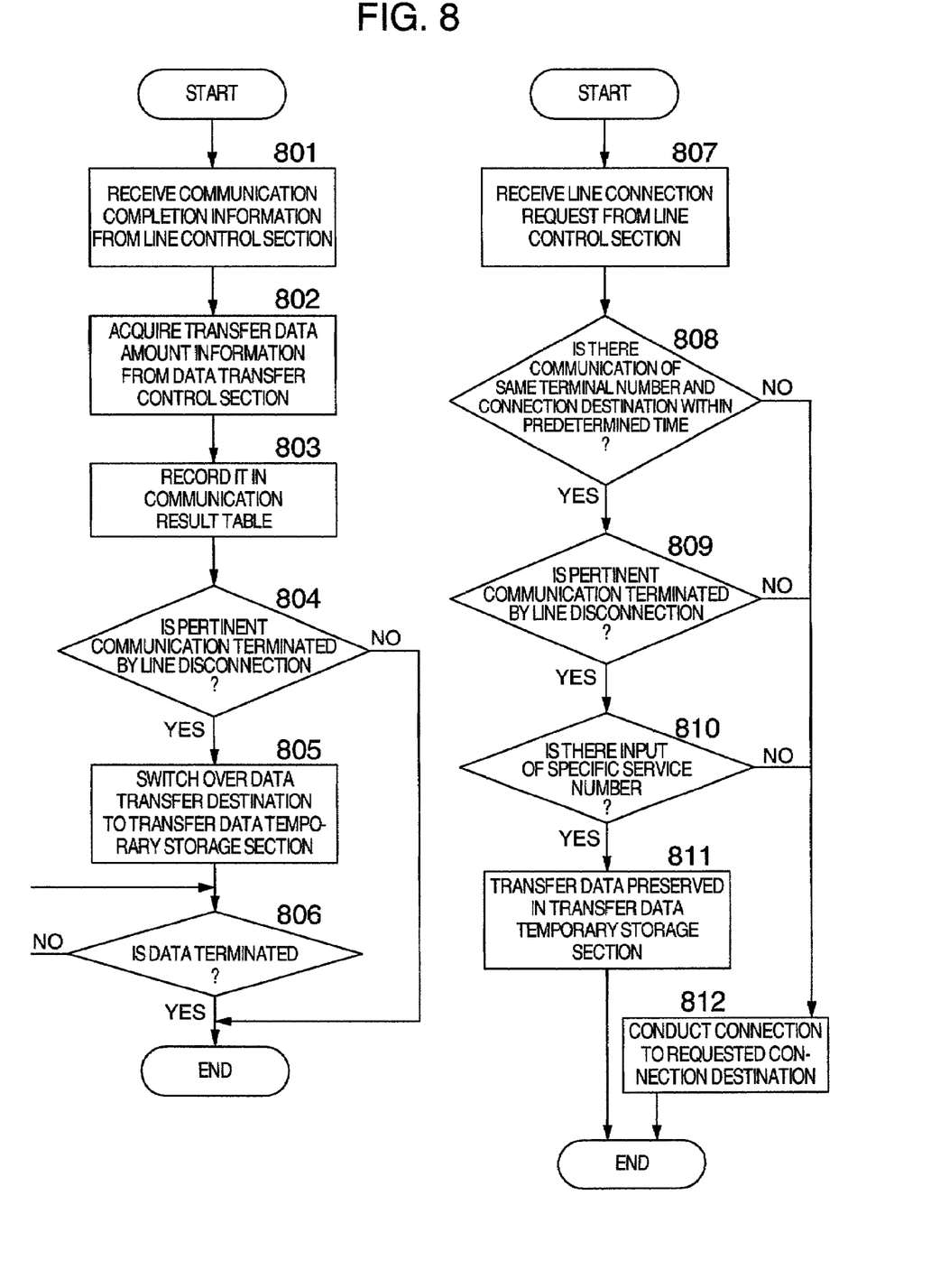
FIG. 8 is a flow chart showing a processing procedure of processing of transferring transfer data that has not yet transferred, to a portable information communication terminal 101 for which data communication is interrupted by disconnection of a communication line, according to the present invention.

FIG. 8 is a flow chart showing a procedure of processing of transferring transfer data that has not yet been transferred to a portable information communication terminal 101 interrupted in data communication by disconnection of a communication line, according to the present embodiment. As shown in FIG. 8, the data transfer control section 208 of the data transfer control apparatus 105 of the present embodiment conducts processing of storing transfer data transferred between the portable information communication terminal 101 and the data communication apparatus 109 in the transfer data temporary storage section 209. Furthermore, if a portable information communication terminal 101 interrupted in data communication by disconnection of a communication line has requested reconnection to a data communication apparatus 109 that was in connection thereto at the time of interruption, then the communication situation control section 205 of the communication control apparatus 106 orders the data transfer control section 208 to transfer the transfer data that has not yet been transferred and that is stored in the transfer data temporary storage section 209 to the portable information communication terminal 101.

As shown in FIG. 8, the communication situation control section 205 of the communication control apparatus 106 receives communication completion information from the line control section 203 (step 801). On the other hand, the communication situation control section 205 acquires information of the amount of transfer data from the data transfer control section 208 (step 802), edits those kinds of information, and stores a result thereof in the communication result table 206 (step 803).

Subsequently, the communication situation control section 205 determines whether the pertinent communication has been terminated by line disconnection by referring to the communication termination code (step 804). In the case of termination caused by line disconnection, it is conceivable that the data transfer might not have been completed. Therefore, the communication situation control section 205 orders the data transfer control section 208 to switch the data transfer destination over to the transfer data temporary storage section 209 (step 805).

Hereafter, the data transfer control section 208 of the data transfer control apparatus 105 monitors the transfer data, and continues the data transfer to the transfer data temporary storage section 209 until the end of the pertinent transfer data (step 806).

In the present embodiment, the transfer destination of the transfer data is changed to the transfer data temporary storage section 209, after line disconnection is judged to have occurred. However, it is also possible to adopt such a cache system that data is always transferred via the transfer data temporary storage section 209. When line disconnection has occurred in this case, remaining data is stored in the transfer data temporary storage section 209 as it is.

Upon receiving a line connection request from the line connection section 203 (step 807), the communication situation control section 205 of the communication control apparatus 106 determines whether there has been communication of the same portable information communication terminal number and connection destination number within a predetermined time before the connection request time (step 808). If there is the above described communication, then the communication situation control section 205 determines whether the pertinent communication has been terminated due to line disconnection, by referring to the termination code in the communication result table 206 (step 809).

If the pertinent communication has been terminated by line disconnection, then the communication situation control section 205 determines whether a specific service number for requesting transfer of transfer data that has not been transferred is input from a portable information communication terminal that is requesting the line connection (step 810). If the specific service number is input, then the communication situation control section 205 issues an order to the data transfer control section 208 instead of connecting the portable information communication terminal to a requested connection destination, and thereby transfers data that was not transferred the last time and that is preserved in the transfer data temporary storage section 209 (step 811). Furthermore, if neither of the steps 808 to 810 is not satisfied, then the communication situation control section 205 carries out normal connection to the requested connection destination (step 812).

Owing to the series of operations, the processing of transferring the transfer data that has not yet been transferred to the portable information communication terminal interrupted in data communication by disconnection of the communication line can be implemented.

As described above, data transfer can be continued, in the present embodiment, from a place that is not completed in transfer, with simple operation, without imposing special constraints on the transfer data or the portable information communication terminal 101 and the data communication apparatus 109. Furthermore, the present embodiment has also an effect that the time required for conducting authentication between the portable information communication terminal 101 and the data communication apparatus 109 can be shortened at the time of reconnection.

Figure 9:
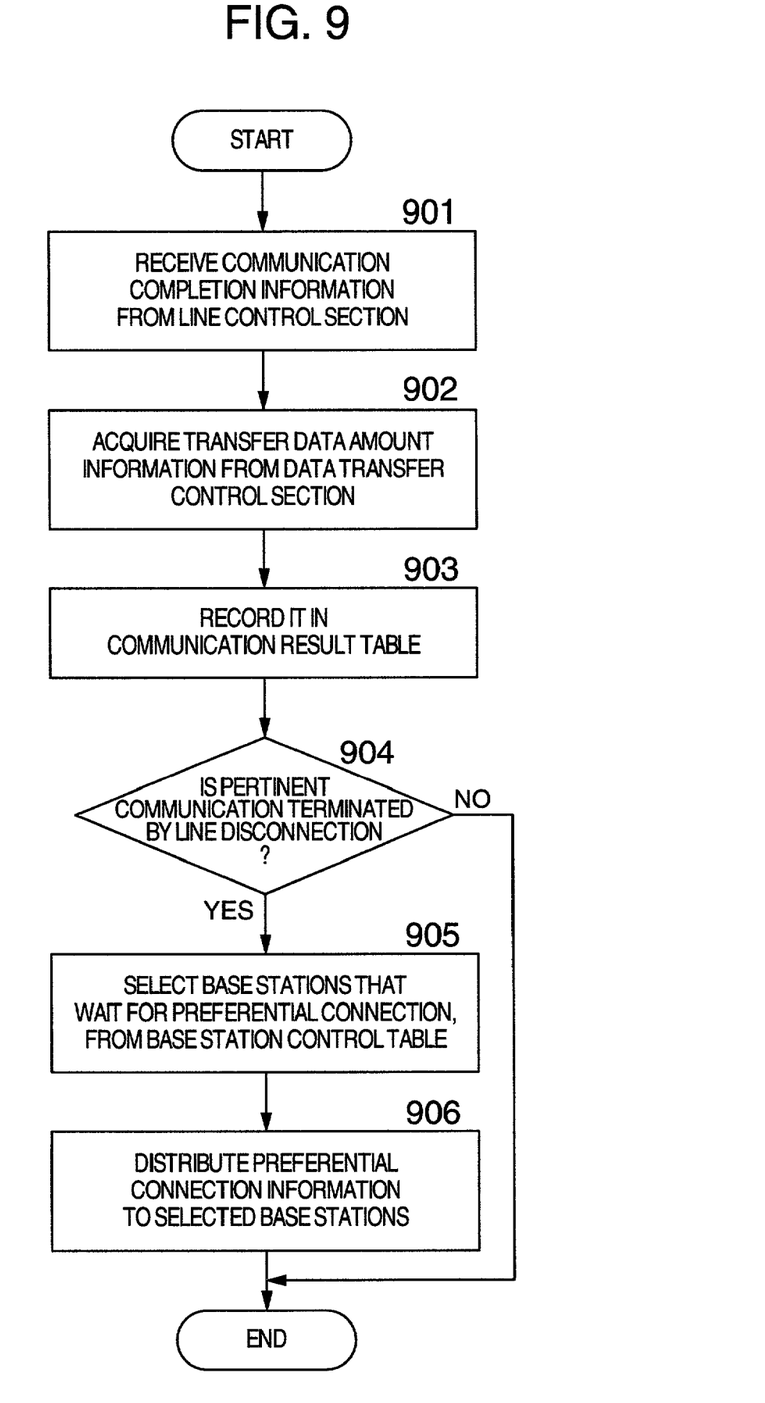
FIG. 9 is a flow chart showing a processing procedure of processing conducted in a communication control apparatus 106 to connect preferentially a portable information communication terminal 101 for which data communication is interrupted by disconnection of a communication line, according to the present invention.

FIG. 9 is a flow chart showing a procedure of processing conducted by the communication control apparatus 106 in the present embodiment to preferentially connect a portable information communication terminal 101 interrupted in data communication by disconnection of a communication line. If data communication between a portable information communication terminal 101 and the data communication apparatus 109 is interrupted by disconnection of a communication line, then the communication situation control section 205 of the communication control apparatus 106 in the present embodiment conducts processing of distributing preferential connection information for preferentially connecting the portable information communication terminal 101, to the radio base stations as shown in FIG. 9.

As shown in FIG. 9, the communication situation control section 205 of the communication control apparatus 106 receives communication completion information from the line control section 203 (step 901). On the other hand, the communication situation control section 205 acquires information of the amount of transfer data from the data transfer control section 208 (step 902), edits those kinds of information, and stores a result thereof in the communication result table 206 (step 903).

Subsequently, at step 904, the communication situation control section 205 determines whether the pertinent communication is terminated by line disconnection, by referring to the communication termination code. In the case of termination due to line disconnection, the communication situation control section 205 selects a radio base station that is adjacent in radio area to, or near in location, a radio base station 102 that conducted the pertinent radio communication, by referring to information indicating the radio base station 102 included in the communication completion information and the radio base station control table 207 (step 905). This step is conducted because it is possible that after the line disconnection the portable information communication terminal 101 will move and be away from the radio area 103 of the radio base station 102 with which the communication was conducted.

Subsequently, the communication situation control section 205 distributes preferential connection information including the terminal number that conducted the pertinent communication, the connection destination number, and time of the preferential connection to the selected radio base stations (step 906).

Figure 10:
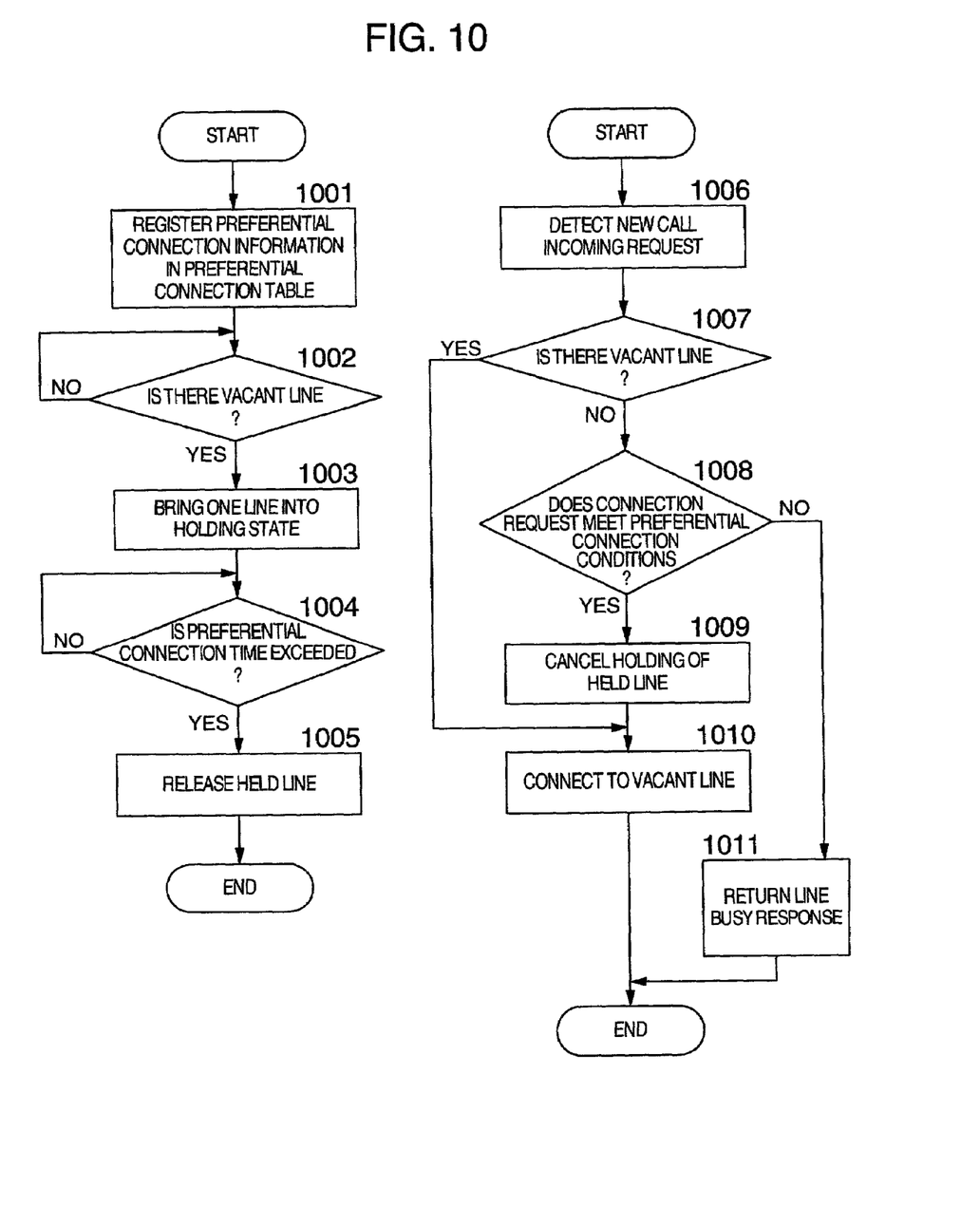
FIG. 10 is a flow chart showing a processing procedure of processing conducted in a radio base station to connect preferentially a portable information communication terminal 101 for which data communication is interrupted by disconnection of a communication line, according to the present invention.

FIG. 10 is a flow chart showing a procedure of processing conducted in the radio base station in the present embodiment to connect preferentially a portable information communication terminal 101 interrupted in data communication by disconnection of a communication line. As shown in FIG. 10, the line control section 203 of the radio communication station receives the preferential connection information, and secures a vacant line. Upon sensing a call incoming request from a portable information communication terminal that meets the preferential connection information, the line control section 203 conducts processing of connecting the portable information communication terminal 101 preferentially by using the secured vacant line.

Steps 1001 to 1005 of FIG. 10 represents operation of securing a preferential connection line in the radio base station. Upon receiving the preferential connection information, the radio base station registers the preferential connection information in the preferential connection table 204 (step 1001). Subsequently, the line control section 203 inquires of the radio section 202 as to whether there is a vacant line (vacant band) (step 1002). If there is a vacant line in this stage, then the line control section 203 orders the radio section 202 to bring one line into a line holding state in order to secure the line (step 1003). If at this time there are no vacant lines, i.e., all radio lines of the pertinent radio base station are in use, then the line control section 203 continues monitoring until a vacant line is obtained. Furthermore, the line control section 203 conducts monitoring to determine whether the specified preferential connection time is exceeded even if the line is brought into the holding state (step 1004). If the preferential connection time is exceeded, then the line control section releases the held line (step 1005).

Steps 1006 to 1011 of FIG. 10 represent operation of preferential connection in the radio base station. When a new call incoming request is sensed in the radio base station (step 1006), the line control section 203 determines whether there is a vacant line (step 1007). If there is a vacant line, then the line control section 203 conducts ordinary connection processing (step 1010).

If there are no vacant lines, the line control section 203 determines whether the terminal number and the connection destination number of the pertinent connection request meet the preferential connection conditions controlled in the preferential connection table 204 (step 1008). If they meet the preferential connection conditions, then the line control section 203 produces a vacant line by canceling the holding of the line held for the purpose of the preferential connection (step 1009), and conducts connection to the vacant line (step 1010). If it is found at the step 1008 that the connection request does not meet the preferential connection conditions, then the line control section 203 conducts ordinary processing of the case where all lines are in use, such as, for example, returning a line busy response to the portable information communication terminal that is requesting connection as shown in step 1011. Owing to the series of operations, the processing of connecting preferentially a portable information communication terminal 101 interrupted in data communication by disconnection of a communication line can be implemented.

When a line is disconnected by aggravation of the radio wave state or the like, the user of the pertinent terminal might want to be connected to the same connection destination again. In such a case, the user of the pertinent terminal can be connected preferentially to the same connection destination again in the present embodiment as described above. Therefore, smooth reconnection becomes possible.

Figure 11:
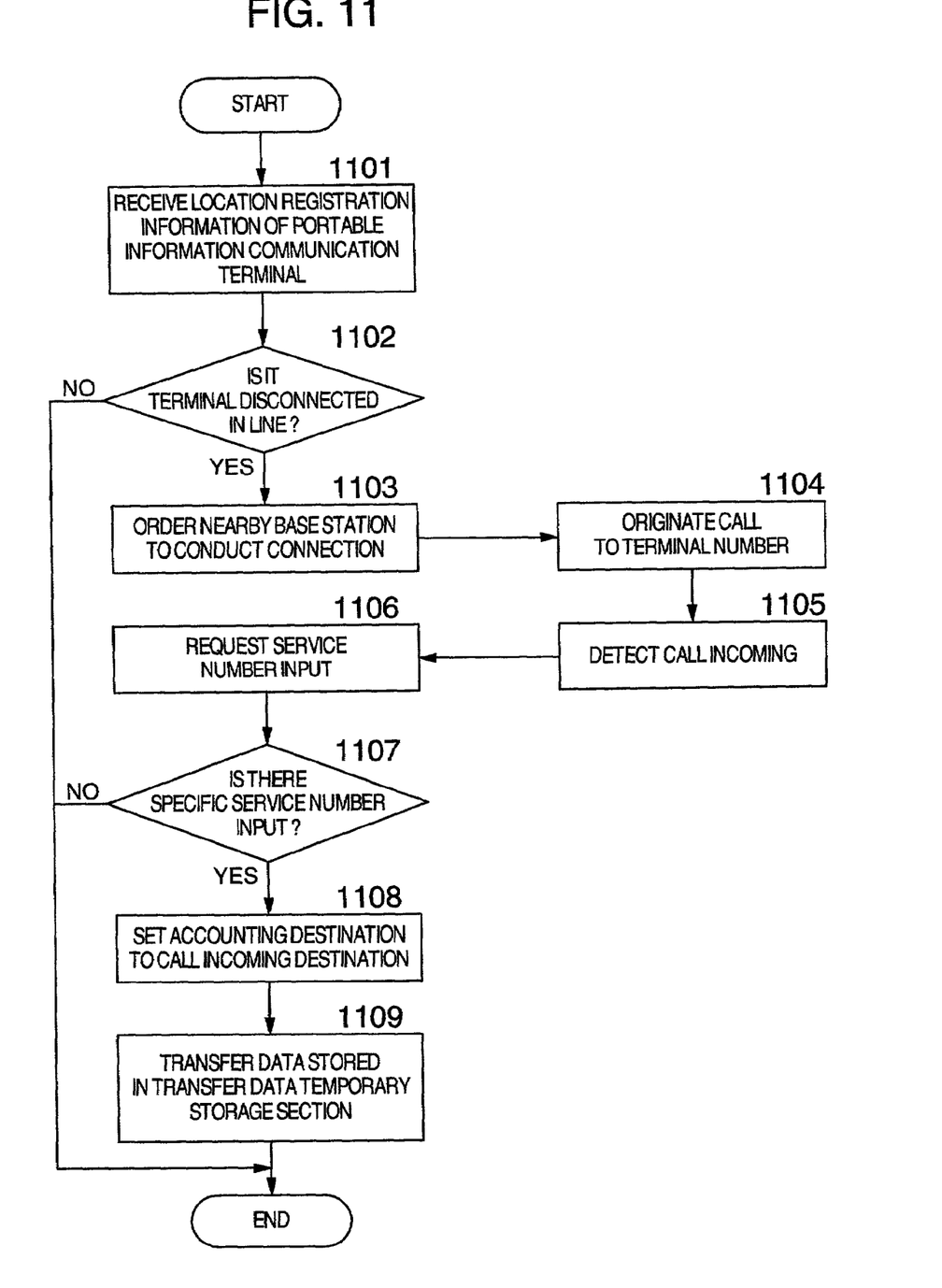
FIG. 11 is a flow chart showing a processing procedure of processing of establishing connection between a radio base station and a portable information communication terminal 101 for which data communication is interrupted by disconnection of a communication line, and transferring transfer data that have not been transferred, according to the present invention.

FIG. 11 is a flow chart showing a procedure of processing of connecting the radio base station to a portable information communication terminal 101 interrupted in data communication by disconnection of a communication line and transferring transfer data that has not yet been transferred, in the present embodiment. If data communication between a portable information communication terminal 101 and the data communication apparatus 109 is interrupted by disconnection of a communication line, then the communication situation control section 205 of the communication control apparatus 106 in the present embodiment conducts processing of ordering the radio base station to conduct connection to the portable information communication terminal 101 and ordering the data transfer control section 208 to transfer the transfer data that has not yet been transferred and that is stored in the transfer data temporary storage section 209 to the portable information communication terminal 101. Furthermore, the accounting calculation section 210 of the accounting apparatus 107 conducts processing of conducting accounting of the data communication on the portable information communication terminal 101 of the transfer destination.

The processing of FIG. 11 is premised on that data which is being transferred is temporarily stored when line disconnection has occurred as described with reference to FIG. 8. In other words, it is assumed that the processing of the steps 801 to 806 has been conducted.

As shown in FIG. 11, the communication situation control section 205 of the communication control apparatus 106 receives location registration information of a portable information communication terminal seized by the radio base station, via the line control section 103 (step 1101). The communication situation control section 205 determines whether the number of the portable information communication terminal included in the pertinent location information is the same as the terminal number of the portable information communication terminal 100 that was disconnected in line within a predetermined time (step 1102). If it is confirmed that the portable information communication terminal acquired in location information is the terminal that was disconnected in line within a predetermined time, then the communication situation control station 205 finds a radio base station located nearest the location of the terminal by referring to the radio base station control table 207, and orders the line control section 203 of the pertinent nearby radio base station to conduct connection to the pertinent terminal (step 1103).

The radio base station originates a call to the terminal number of the pertinent terminal (step 1104). In succession, the line control section 203 of the pertinent radio base station monitors call incoming to the pertinent terminal. If call incoming is detected (step 1105), then the communication situation control section 205 requests the pertinent terminal to input a specific service number for requesting transfer of transfer data that has not yet been transferred (step 1106). If the specific service number is input (step 1107), then the communication situation control section 205 sets the accounting destination of the accounting system to the pertinent terminal that is the call incoming destination of the present communication (step 1108), and transfers the data that was not transferred when a line was disconnected in communication of last time and that has been stored in the transfer data temporary storage section 209 to the pertinent terminal (step 1109).

Owing to the series of operations, the processing of conducting connection from a radio base station to a portable information communication terminal 101 interrupted in data communication by disconnection of a communication line and transferring the transfer data that has not yet been transferred to the portable information communication terminal can be implemented.

When the radio wave state has been recovered, it becomes possible to connect a line without originating a call from the user of the pertinent terminal in the present embodiment as described above. And since the accounting destination is switched over to the call incoming side, accounting on the user of the pertinent portable information communication terminal is implemented. Furthermore, without imposing special restrictions on the transfer data or the portable information communication terminal 101 and the data communication apparatus 109, it becomes possible to continue the data transfer from a place that is not completed in transfer, with simple operation.

In the communication control system of the present embodiment, accounting on data communication interrupted by disconnection of a communication line is cleared after normal termination of the pertinent data communication, as heretofore described. When a communication line is disconnected during data communication with the portable information communication terminal and the user of the communication connects a line again and continues data communication, therefore, it is possible to prevent occurrence of extra accounting on the user of the pertinent communication.

Furthermore, in the communication control system of the present embodiment, transfer data that has not yet been transferred is transferred to a portable information communication terminal interrupted in data communication by disconnection of communication line. In the case where a communication line is disconnected during data communication with the portable information communication terminal, therefore, the labor and time of data communication at the time of reconnection can be reduced.

Furthermore, in the communication control system of the present embodiment, the portable information communication terminal interrupted in data communication by disconnection of a communication is connected preferentially. In the case where a communication line is disconnected during data communication with the portable information communication terminal, therefore, reconnection can be conducted smoothly.

Furthermore, in the communication control system of the present embodiment, connection from a radio base station to a portable information communication terminal interrupted in data communication by disconnection of a communication line is conducted, and transfer data that has not yet been transferred is transferred. In the case where a communication line is disconnected during data communication with the portable information communication terminal, therefore, it is possible to automatically conduct reconnection and reduce the labor and time of data communication at the time of reconnection.

According to the present invention, accounting on the data communication interrupted by disconnection of a communication line is cleared after normal termination of the pertinent data communication. When a communication line is disconnected during data communication with the portable information communication terminal and the user of the communication connects a line again and continues data communication, therefore, it is possible to prevent occurrence of extra accounting on the user of the pertinent communication.

What is claimed is:

1. A communication control method for controlling wireless data communication conducted between a portable information communication terminal and a data communication apparatus via a communication network including a radio communication network, said communication control method comprising the steps of:
    determining a termination situation, when wireless data communication between said portable information communication terminal and said data communication apparatus has been disconnected, so as to classify the termination situation into normal termination, which is a disconnection according to normal procedure, or interrupted line disconnection, which is a disconnection interrupted without normal procedure, wherein accounting data is stored for each data communication with the termination situation;
    checking the stored accounting data to determine whether there is any accounting data for the data communication between said portable information communication terminal and said data communication apparatus, for which the termination situation is classified as interrupted line disconnection, and which occurred within a predetermined time before the normal termination of data communication between the portable information communication terminal and the data communication apparatus;
    if accounting data for which the termination situation is classified as interrupted line disconnection is found in the checking step, clearing the found accounting data to avoid charging for the disconnection interrupted without normal procedure.

2. A communication control system for controlling wireless data communication conducted between a portable information communication terminal and a data communication apparatus via a communication network including a radio communication network, said communication control system comprising:
    means for determining a termination situation, when wireless data communication between said portable information communication terminal and said data communication apparatus has been disconnected, so as to classify the termination situation into normal termination, which is a disconnection according to normal procedure, or interrupted line disconnection, which is a disconnection interrupted without normal procedure, wherein accounting data is stored for each data communication with the termination situation;
    means for checking the stored accounting data to determine whether there is any accounting data for the data communication between said portable information communication terminal and said data communication apparatus, for which the termination situation is classified as interrupted line disconnection, and which occurred within a predetermined time before the normal termination of data communication between the portable information communication terminal and the data communication apparatus;
    if accounting data for which the termination situation is classified as interrupted line disconnection is found, means for clearing the found accounting data to avoid charging for the disconnection interrupted without normal procedure.

3. A storage medium containing a program operative on a computer to function as a communication control system for controlling wireless data communication conducted between a portable information communication terminal and a data communication apparatus via a communication network including a radio communication network, wherein said program when executed is operative on the computer to perform the steps of:

determining a termination situation, when wireless data communication between said portable information communication terminal and said data communication apparatus has been disconnected, so as to classify the termination situation into normal termination, which is a disconnection according to normal procedure, or interrupted line disconnection, which is a disconnection interrupted without normal procedure, wherein accounting data is stored for each data communication with the termination situation;

checking the stored accounting data to determine whether there is any accounting data for the data communication between said portable information communication terminal and said data communication apparatus, for which the termination situation is classified as interrupted line disconnection, and which occurred within a predetermined time before the normal termination of data communication between the portable information communication terminal and the data communication apparatus;

if accounting data for which the termination situation is classified as interrupted line disconnection is found in the checking step, clearing the found accounting data to avoid charging for the disconnection interrupted without normal procedure.

* * * * *